United States Patent Office 3,135,778
Patented June 2, 1964

3,135,778
REDISTRIBUTION OF ORGANOSILANES
Geoffrey John Sleddon, West Kilbride, Scotland, assignor to Imperial Chemical Industries Limited, London, England, a corporation of Great Britain
No Drawing. Filed Sept. 27, 1961, Ser. No. 140,995
Claims priority, application Great Britain Oct. 28, 1960
12 Claims. (Cl. 260—448.2)

This invention relates to the production of organosilicon compounds and more particularly to the production of organohalogenosilanes.

Organosilicon compounds such as the organosilanes and organohalogenosilanes are well known and widely available and may be prepared in a variety of ways. Frequently, however, the method of preparation does not give as end products the most desirable products for use in further processing. It is therefore necessary in many cases either to discard a considerable proportion of the products or to effect a redistribution reaction among the end products in order to increase the yields of the desired organosilanes and organohalogenosilanes. This redistribution step has been achieved by sundry methods, for example, by reaction under pressure at elevated temperatures in the presence of aluminum chloride as catalyst. The methods hitherto available however suffer from one or more disadvantages. Thus, for example, the aluminum chloride catalyzed reaction suffers from the disadvantage that temperatures in excess of 280° C. are required to ensure an adequate rate of reaction. Redistribution using aluminum chloride as a catalyst in presence of a silane containing silicon-bonded hydrogen atoms has also been widely used. This process however suffers from two disadvantages. A long reaction time is required to get adequate redistribution and it is adversely affected by the presence of hydrogen chloride in the reaction mixture which it is difficult to avoid.

An object of the present invention is to provide a process for the redistribution of organosilanes. Another object is to provide such a process which can be carried out more rapidly than hitherto. A further object is to provide such a process which is less affected by the presence of hydrochloric acid in the reaction mixture than have been previous processes. Other objects will appear hereinafter.

According to the present invention these objects are accomplished by a process comprising reacting together at elevated temperature a compound of the general formula $R_aSiCl_{(4-a)}$ and a compound of the general formula $R_b'SiCl_{(4-b)}$ where R and R' are alkyl groups, $a$ is 1, 2, 3 or 4 and $b$ is 0, 1, 2 or 3, in the presence of a silane containing silicon-bonded hydrogen, aluminum chloride and metallic magnesium.

A wide variety of silanes containing silicon-bonded hydrogen may be used in the process of our invention. Suitable silanes are those of the general formula $$R_c''SiH_{(4-c-d)}Cl_d$$

where R'' is an alkyl or aryl group and $c$ and $d$ are 0, 1, 2 or 3 and $c+d$ is not greater than 3. Suitable examples of such compounds are methyldichlorsilane, trichlorsilane and phenyldichlorsilane. This silane may be used in amount from 2 to 10 percent of the total weight of the two other silicon compounds. It is however preferred to use amounts within the range 4 to 8 percent.

The amounts of aluminum chloride used may vary widely, for example, from 2 to 10 percent by weight of the two first mentioned silicon compounds. It is in general, however, preferred to use amounts of the order of 4 to 8 percent by weight.

The amount of magnesium metal used may vary from about 1 to about 10 percent by weight of the reaction mixture. Amounts of the order of about 3 to 5 percent are in general preferred and normally gives satisfactory results.

The reaction may be carried out over a wide range of elevated temperatures for example, up to about 400° C. It is normally preferred, however, to operate at temperatures within the range 150–200° C.

The reaction is normally preferably carried out at superatmospheric pressures which may, if desired, be generated autogenously. The pressure may be up to the order of 200 atmospheres. Pressures of the order of 10 to 15 atmospheres are in general satisfactory and are preferred.

The proportions of the two reactant silicon compounds used may vary widely. It is however preferred to employ them in such proportions that there are between 0.3 and 3 chlorine atoms per silicon-bonded organic radical in the reaction mixture. In many cases it is further preferred to use a reaction mixture which contains equimolecular proportions of chlorine and silicon-bonded organic radicals.

Our invention is further illustrated by the following examples in which all parts and percentages are by weight.

Examples 1 to 3

10.8 parts of trimethylchlorsilane and 14.9 parts of methyltrichlorsilane together with 2.5 parts of methyldichlorsilane, 2.5 parts of aluminum chloride and 1 part of magnesium were heated together in a closed glass-lined reaction vessel at 150° C. for 3 hours. The reaction vessel was then cooled, opened and the liquid product decanted therefrom. This liquid product was separated into its constituent chlorsilanes by distillation.

The reaction was repeated twice. In the first repetition heating was for 8 hours and in the second repetition for 16 hours. The products obtained in each case are shown in the following table.

| Example | Heating period, hours | Product, parts | Product analysis (percent) | | | |
|---|---|---|---|---|---|---|
| | | | $(CH_3)_3SiCl$ | $(CH_3)_2SiCl_2$ | $CH_3SiCl_3$ | $CH_3SiHCl_2$ |
| 1 | 3 | 27.5 | 18 | 59 | 19 | 4 |
| 2 | 8 | 26.8 | 8 | 78 | 11 | 3 |
| 3 | 16 | 27.4 | 4 | 88 | 6 | 2 |

Example 4

6.6 parts of tetramethylsilane, 22.3 parts of methyltrichlorsilane, 2.2 parts of methyldichlorsilane, 2 parts of aluminum chloride and 1.5 parts of magnesium were heated together in a closed glass-lined reaction vessel at 320° C. for 35 minutes. The reaction vessel was then cooled and 31 parts of liquid reaction product removed therefrom. 82 percent of this product was dimethyldichlorsilane.

The process was repeated with the omission of the magnesium. In this case 30.5 parts of product containing 31 percent of dimethyldichlorsilane were obtained thus showing that the redistribution had taken place much more slowly in the absence of magnesium.

Example 5

The procedure of Example 1 was repeated except that the mixture was heated at 155° C. for 16 hours. There was recovered from the reaction product 23.0 parts of dimethyldichlorsilane.

This process was repeated with the omission of the methyldichlorsilane. In this case the product contained only 4.1 parts of dimethyldichlorsilane.

*Examples 6 to 8*

Mixtures consisting of 432 parts of trimethylchlorsilane, 596 parts of methyltrichlorsilane, 52 parts of methyldichlorsilane, and 52 parts of aluminum chloride were heated with varying proportions of metallic magnesium at 150° C. for 16 hours in a stainless steel pressure vessel. The reaction product was separated into its constituent chlorsilanes. The products obtained and the quantities of magnesium used are shown in the following table.

The process was repeated using no magnesium and the results obtained are also shown in the table.

| Example | Mg (parts) | Products (parts) | | | |
|---|---|---|---|---|---|
| | | $(CH_3)_3SiCl$ | $(CH_3)_2SiCl_2$ | $CH_3SiCl_3$ | $CH_3SiHCl_2$ |
| 6 | 20 | 31 | 931 | 42 | 34 |
| 7 | 10 | 41 | 898 | 61 | 18 |
| 8 | 15 | 49 | 843 | 78 | 20 |
| | | 134 | 605 | 277 | 10 |

*Example 9*

288 parts of tetramethylsilane, 516 parts of silicon tetrachloride and 91 parts of trichlorsilane were heated together with 40 parts of aluminum chloride and 16 parts of magnesium in a steel autoclave at 160° C. for 17 hours. The maximum pressure attained was 12 atmospheres. At the end of the heating period the autoclave was cooled, opened and the liquid contents removed. 851 parts of product were recovered from which were separated 710 parts of dimethyldichlorsilane, 40 parts of trimethylchlorsilane, 84 parts of methyltrichlorsilane and 17 parts of trichlorsilane.

What I claim is:

1. A process for the redistribution of organosilanes comprising reacting together at elevated temperatures a compound of the general formula $R_aSiCl_{(4-a)}$ and a different compound of the general formula $R_b'SiCl_{(4-b)}$ where R and R' are alkyl groups, $a$ is an integer of from 1 to 4, and $b$ is an integer of not greater than 3, in the presence of from about 2 to about 10 percent by weight thereof of a silane containing silicon-bonded hydrogen of the general formula $R_c''SiH_{(4-c-d)}Cl_d$, where R'' is selected from the group consisting of an alkyl and an aryl group, $c$ and $d$ are integers of not greater than 3 and $c+d$ is not greater than 3, from about 2 to about 10 percent by weight of the two first mentioned compounds of aluminum chloride and from 1 to about 10% by weight of the reaction mixture metallic magnesium, the reaction being carried out under a super atmospheric pressure of up to the order of 200 atmospheres.

2. A process as claimed in claim 1 wherein the amount of silane containing silicon-bonded hydrogen used is within the range of from about 4 to about 8 percent.

3. A process as claimed in claim 1 wherein the aluminum chloride is used in amount from about 4 to about 8 percent.

4. A process as claimed in claim 1 wherein the amount of magnesium metal is from about 3 to about 5 percent.

5. A process as claimed in claim 1 wherein the reaction is carried out at an elevated temperature of not more than about 400° C.

6. A process as claimed in claim 5 wherein the temperature of operation is within the range 150–200° C.

7. A process as claimed in claim 1 wherein the pressure used is of the order of 10 to 15 atmospheres.

8. A process as claimed in claim 1 wherein the proportions of the two reactant silicon compounds are such that there are from about 0.3 to about 3 chlorine atoms per silicon-bonded organic radical in the reaction mixture.

9. A process as claimed in claim 8 wherein the reaction mixture contains equimolecular proportions of chlorine and silicon-bonded organic radicals.

10. A process as claimed in claim 1 wherein the silane containing silicon-bonded hydrogen is methyldichlorsilane.

11. A process as claimed in claim 1 wherein the silane containing silicon-bonded hydrogen is trichlorsilane.

12. A process as claimed in claim 1 wherein the silane containing silicon-bonded hydrogen is phenyldichlorsilane.

References Cited in the file of this patent

UNITED STATES PATENTS 2,786,861 McEntee _____ Mar. 26, 1957

OTHER REFERENCES

Fukukawa et al., 51 Chem. Abstracts 12845 (1957).